US009162914B1

(12) United States Patent
Nenoff et al.

(10) Patent No.: US 9,162,914 B1
(45) Date of Patent: Oct. 20, 2015

(54) SYSTEM AND METHOD FOR THE CAPTURE AND STORAGE OF WASTE

(71) Applicants: Sandia Corporation, Albuquerque, NM (US); Argonne National Laboratory, Lemont, IL (US)

(72) Inventors: Tina M. Nenoff, Albuquerque, NM (US); Dorina Florentina Sava Gallis, Albuquerque, NM (US); Karena Chapman, Naperville, IL (US); Peter Chupas, Naperville, IL (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/061,345

(22) Filed: Oct. 23, 2013

Related U.S. Application Data

(60) Provisional application No. 61/717,209, filed on Oct. 23, 2012.

(51) Int. Cl.

| | |
|---|---|
| ***G21F 9/16*** | (2006.01) |
| ***C03B 5/00*** | (2006.01) |
| ***G21F 9/02*** | (2006.01) |

(52) U.S. Cl.
CPC .. *C03B 5/005* (2013.01); *G21F 9/02* (2013.01)

(58) Field of Classification Search
CPC ............... G21F 9/00; G21F 9/16; G21F 1/00; B09B 3/00; B09B 5/00
See application file for complete search history.

(56) References Cited

U.S. PATENT DOCUMENTS

| | | | | |
|---|---|---|---|---|
| 8,262,950 | B1 * | 9/2012 | Nenoff et al. | 252/625 |
| 8,334,421 | B1 * | 12/2012 | Gao et al. | 588/11 |
| 2011/0048916 | A1 * | 3/2011 | Novak | 201/3 |

OTHER PUBLICATIONS

Baerlocher, CH et al. "Atlas of Zeolite Framework Types", 2007, 6$^{th}$ edition, Elsevier.

Cheon, Young Eun et al., "Enhanced Hydrogen Storage by Palladium Nanoparticles Fabricated in Redox-Active Metal-Organic Framework", Angewandte Chemie, 2009, pp. 2899-2903, vol. 48.

Hermes, Stephan et al. "Metal@MOF: Loading of Highly Porous Coordination Polymers Host Lattices by Metal Organic Chemical Vapor Deposition", Angewandte Chemie, 2005, pp. 6237-6241, vol. 44.

Sabo, Michal et al., "Solution infilftration of palladium into MOF-5 synthesis, physisorption and catalytic properties", Journal of Materials Chemistry, 2007, pp. 3827-3832, vol. 17.

* cited by examiner

*Primary Examiner* — Edward Johnson
(74) *Attorney, Agent, or Firm* — Daniel J. Jenkins

(57) ABSTRACT

The present disclosure is directed to systems and methods that absorb waste into a metal-organic framework (MOF), and applying pressure to the MOF material's framework to crystallize or make amorphous the MOF material thereby changing the MOF's pore structure and sorption characteristics without collapsing the MOF framework.

14 Claims, 1 Drawing Sheet

SYSTEM AND METHOD FOR THE CAPTURE AND STORAGE OF WASTE

CROSS-REFERENCE TO RELATED APPLICATIONS

This application claims priority to U.S. Provisional Patent Application No. 61/717,209, filed on Oct. 23, 2012, entitled "ONE-STEP CAPTURE AND STORAGE OF VOLATILE FISSION GASES", the entirety of which is incorporated herein by reference.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to systems and methods for waste capture and storage, and is more particularly directed to systems and methods for capturing and storing hazardous waste gases with metal-organic frameworks (MOFs).

BACKGROUND

The capture and storage (CSS) of waste materials continues to be a problem is many industries. In the nuclear industry, the capture and storage of fission gases is important in both the disposal of large quantities of high level radioactive wastes generated in the reprocessing of spent power reactor fuel and from nuclear reactor accidents. It is generally accepted that the most promising approach is to convert these radioactive wastes to a dry solid form which would render such wastes chemically, thermally and radioactively stable. This problem of dry solid stability is closely related to the safety of human life on earth for a period of over 20,000 years. For example, radioactive wastes contain isotopes including $^{129}I$, $^{90}Sr$, $^{240}Pu$, and $^{137}Cs$, whose half-lives are >15 million years, 29 years, 66,000 years, and 30 years respectively. These isotopes alone pose a significant threat to life and must be put into dry, solid forms that are stable for thousands of years. The solid radioactive waste form must be able to keep the radioactive isotopes immobilized for this length of time, preferably even in the presence of a water environment.

For radioactive gases, one present immobilization route is the so-called dry solids approach which involves the method of fixation of waste materials in glasses via melting glass procedures. This approach offers some improvement regarding isolation and decrease in the rate of release of radioactive elements when the outer envelopes or containers are destroyed. However, standard nuclear waste glasses (such as borosilicate glass) glasses with high chemical durability and low alkali ion conductivities are melted at very high temperatures, e.g., 1800° C. and higher. Such high melting processes are economically unsound and moreover, cause a dangerous problem due to the volatilization of pernicious radioactive materials. Additionally, none or very small amounts of gaseous radioactive materials are further trapped in case of volatilization during glass formation.

In nuclear power accident clean-up, the removal of radioactive Cs and/or Sr from seawater or containment fluids is a critical issue. Other scenarios include the removal of uranium (U) based compounds and ions from water systems in case of accidents of for reuse, and/or in the act of resource extraction (in a sense ocean water "mining").

In the power generation industry, and in particular coal fired power generation, the generation and release into the atmosphere of large quantities of $CO_2$ remains an area of concern. A number of $CO_2$ CCS technologies have been developed. One method for CCS uses metal oxide solutions, such as potassium or magnesium oxide, to remove $CO_2$ from flue gas or other $CO_2$ containing vent gases. The general capture mechanism involves reaction of the metal oxides with $CO_2$ to form metal carbonates. These carbonate salts can either be land-filled, or be regenerated via oxidation to form a concentrated $CO_2$ stream that can be compressed and injected into geological formations for storage.

Present methods of gas capture, and in particular, waste gas capture, lack the ability to store the captured gas in a stable form for a lengthy period of time. In particular, present day storage does not provide sufficient isolation and immobilization of such waste material, sufficient long-term resistance to chemical attack by the surroundings, and sufficient stability at high temperature.

In addition, a process for fixating radioactive materials inside a dry solid form having high resistance to leaching and other forms of chemical attack would not only be suitable for the containment, interim storage and possible eventual disposal of radioactive nuclear wastes.

The need remains, therefore, for a method and system for the capture and storage of gases that provides a high degree of stable containment. The need also remains for a method of forming waste forms below the volatilization temperature of the captured waste.

SUMMARY OF THE DISCLOSURE

The present invention is directed to novel systems and methods for the containment of waste. The waste may be a waste gas or an element or molecule in solution. The methods of the invention do not involve any steps which would expose material to temperatures above room temperature (ambient temperature), thereby eliminating the environmental hazard due to volatilization of the captured material into the atmosphere. In addition, there are provided novel systems and methods for the fixation and immobilization of gases and ionic wastes such as, but not limited to the neutral and radioactive forms of I, H, $CO_2$, Kr, Xe, Ra, Cs, Ba, Y, Sr, and Rb.

According to an embodiment, a modified metal-organic-framework (MOF) material is disclosed that includes a waste material adsorbed in the MOF material. The MOF material is modified by converting the crystalline structure of the MOF to an amorphous structure. The waste material may be an element, molecule, or ion in gas or liquid phase.

According to another embodiment of the invention, a method of forming a waste storage material is disclosed that includes providing a MOF material having a crystalline structure, adsorbing a waste material into pores of the metal-organic framework material, and applying pressure to the metal-organic framework material to convert the crystalline structure of the metal-organic framework to an amorphous structure.

According to another embodiment of the present invention, a method of remediating waste is disclosed that includes adsorbing a waste material onto a metal-organic framework material, and applying pressure to the metal-organic framework material to convert the crystalline structure of the metal-organic framework to an amorphous structure One advantage of the present disclosure is to provide a waste form that has improved waste confinement.

Another advantage of the present disclosure is to provide a waste form that physically entraps the gas or molecule with minimal processing including no heating, and non-specialized mechanical pressed amorphization.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

Figure 1:
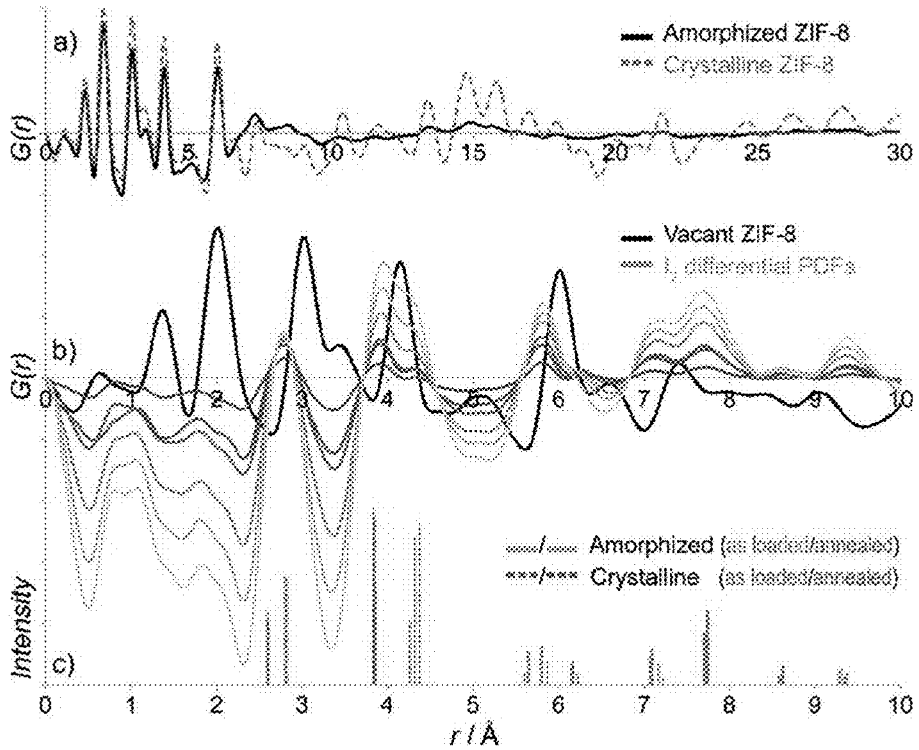
FIG. 1 shows representative synchrotron high energy X-ray pair distribution functions (PDFs) data sets, G(r), for the crystalline and amorphous materials (a), and differential PDFs (b) corresponding to I-I and I-framework interactions in the pressure-amorphized as-loaded series (120 wt % loading) of the MOF commonly named ZIF-8. The intensity and position of features in differential PDFs for crystalline and amorphous, and as-loaded and annealed samples are compared (c).

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present invention is directed to systems and methods for capturing waste, including gases and elements, ions or molecules in solution. The systems and methods provide for a high level of confinement and long term stability. The systems and methods include adsorbing waste into a metal-organic framework (MOF), and applying pressure to the MOF material's crystalline framework to change the framework to an amorphous MOF. This change or modification of the MOF material changes the sorption characteristics without collapsing the MOF cage framework. In such a manner, the modified MOF has improved adsorption retention, reduced desorption kinetics. The modification results in a more compacted, less porous, MOF material with lowered possibility of desorption of guest material. Additionally, modified MOF material, for example modified MOF adsorbed radioactive contaminated $I_2$ are less powdery and have higher resistance to flow compared to unmodified MOFs. The modified MOF may then be further treated/and or contained.

The waste may be a gas or an element or molecule in aqueous solution. The captured waste may be referred to as a "guest." In an embodiment, the waste may be stable or radioactive isotope form of a light gas. In an embodiment, the light gas may be a stable or radioactive isotope form of I, H, CO, $CO_2$, Kr, Xe, Ra, Cs, Ba, Y, Sr, and Rb; also including $CH_4$ and $H_2O$. In an embodiment, the radioactive gas is selected from the group including $^{129}I$, $^{131}I$, $^{3}H$, $^{14}CO_2$, $^{85}Kr$, $^{133}Xe$, $^{90}Sr$, $^{135}Cs$ and $^{137}Cs$, plus the other isotopes of each of these radioelements.

In an embodiment, the waste may be an element or molecule in solution. In an embodiment, the waste may be radioactive cesium in seawater. In another embodiment, the waste may be radioactive uranyl-containing ions in seawater.

The MOF material has an open structure through which the target molecules can diffuse and be adsorbed for capture and storage. MOFs are crystalline framework structures with metal clusters interconnected by organic linker groups, a design that endows the materials with large pores, open channels, and huge internal surface areas for adsorbing molecules. A particular MOF may be selected based on the size of the pore required to receive the target species or guest. The pore size may be selected by the smallest dimension of the molecule that can fit into the pore opening of the MOF and may be aided by temperature and pressure of operating system. In this invention, MOFs can be 3D (cage) or 2D (layered) framework types. MOFs are highly porous crystalline materials, with a very diverse structural and chemical profile. A large set of metal and organic linkers are available. As such, MOFs which can be used in this invention can be categorized following several criteria, including topology (ex. MOFs with zeolitic topologies: zeolitic imidazolate frameworks (ZIFs), zeolite-like metal-organic frameworks (ZMOFs), or based on the organic linkers they include: carboxylate-based MOFs, phosphonate-based MOFs, N-based linker MOFs, N—O-heterofunctional linkers based MOFs. In an embodiment, the MOF may be selected from the group including, but not limited to IRMOFs series (MOF-5), MOF-74 series, Sandia Metal-Organic Frameworks (SMOFs) series, and ZIFs series.

ZIFs are a type of MOF framework. They are generally built from tetrahedral metal nodes and imidazolate ligands and form analogs to zeolite mineral structures. In an embodiment, the ZIF may be selected from the group including, but not limited to ZIF-6, ZIF-8, ZIF-10, ZIF-11. The framework of ZIF-8 has a chemical composition of ZnL2 (wherein L=2-Methylimidazolate, i.e., the anion of 2-Methylimidazole) and a topology defined by the Zn cations that is identical to the zeolitic framework type SOD. SOD is a three letter framework type code for a sodalite structure type, as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007). In an embodiment, the MOF may be ZIF-4, ZIF-5, or ZIF-8.

In another embodiment, the crystalline MOF may be a highly porous coordination polymer, HKUST-1. The framework of HKUST-1 is [$Cu_3$(benzene-1,3,5-carboxylate)$_2$]. It has interconnected [$Cu_2(O_2CR)_4$] units (where R is an aromatic ring), which create a three-dimensional system of channels with a pore size of 1 nanometer and an accessible porosity of about 40 percent in the solid.

In an embodiment the MOF material may be treated by the addition of a metal ion or gas that reacts to form nanoparticles within the pores of the MOF. Those nanoparticles will participate in gas recovery by reaction with the gas as it enters the MOF pore. In an embodiment, the reactive substance may be silver or palladium. Silver provides a reactive nanoparticle component to selectively adsorb $I_2$ gas molecules, resulting in containment of the radioactive iodine. The iodine loaded silver containing MOF is then treated to for a long term storage waste form.

In another embodiment, the reactive particle may be Pd, which may be used to enhance the selectivity and storage capacity of neutral and radioactive forms of hydrogen. Palladium can either impregnate the MOF pore from solution with a Pd precursor, followed by hydrogen reduction (reference: M. Sabo, A. Henschel, H. Frode, E. Klemm, S. Kaskel, J. Mater. Chem. 2007, 17, 3827-3832); another method to impregnate the MOF pore is by vapor deposition, again followed by hydrogen reduction (reference: S. Hermes, M. K. Schroter, R. Schmid, L. Khodeir, M. Muhler, A. Tissler, R. W. Fischer, R. A. Fischer, Angew. Chem. 2005, 117, 6394-6397; Angew. Chem. Int. Ed. 2005, 44, 6237-6241.) Yet another method of impregnating the MOF pore is via solution route, by an autoredox reaction between the organic ligand incorporated in the MOF solid and palladium(II) ions (reference: Cheon, Y. E.; Suh, M. P. Angew. Chem. Int. Ed. 2009, 48, 2899-2903).

The MOF is modified post capture by the application of pressure. The pressure is in an amount sufficient to mechanically modify the MOF to trap the waste gas inside the MOF phase for longer periods of time and to higher temperatures than in the original unmodified MOF. In an embodiment, the amount of pressure is sufficient to create pressure-induced amorphization of the MOF, which alters the pore structure and sorption characteristics of the MOF without collapsing the MOF. In an embodiment, the amount of pressure to amorphized ZIF-8 may be up to 9 tons per square inch (18,000 psi).

Pressure may be applied to the MOF by a variety of applications, such as, but not limited to pressing, grinding, ball milling, sonication, and hot isostatic pressing (HIPping) below the volitization temperature of the waste.

In an embodiment, pressure may be applied by HIPping, at a temperature below the volitization temperature of the waste, of ZIF-8 between pressures of between about 7,350 psi and 18,000 psi. In another embodiment, pressure may be applied by HIPping between pressures of between about 10,000 psi and 18,000 psi. In another embodiment, pressure may be applied by HIPping at a pressure of about 15,000 psi.

The modified MOF containing the stored waste may then be further processed by encapsulating in glass, stored in containers, or forming a core/shell waste form in which formed pellets (the core) are stacked in a low temperature sintered Bi—Si Glass tube (shell) and sealed by a sintered cap of the same composition as the shell, for example by the method disclosed in U.S. Pat. No. 8,262,950, which is herein incorporated by reference in its entirety.

Detailed analysis of the local structure of $I_2$ guests, using a PDF method which can probe both crystalline and amorphous materials, indicates that the MOF crystallographic cage and gas trapping ability remains unaffected by the framework amorphization. In contrast to chemical post synthetic modification of MOFs, mechanical modification through pressure can be applied at an intermediate point in a sorption or sequestration process, rather than simply being used to generate the initial sorbent and sorption characteristics. Consequently, when employed after guest-sorption, mechanical modification alters desorption properties to physically trap guests. This approach decouples guest sorption process from the guest trapping process; the process changes the bulk porosity of the MOF, and the gas sorption pathway into MOF. This is unique and distinct from instances in which adsorption of a molecule into a pore causes the MOF pore to either constrict or expand (sometimes named "guest-triggered switching of pores"). Whatever affects the adsorption of a molecule into the MOF pore on the resultant shape of the pore, the overall resulting MOF-guest molecule can be treated with this amorphization process to form an interim waste form.

ZIF-8, Zn(2-methylimidazole)$_2$, is part of a broad family of MOFs with expanded zeolite topologies—zeolitic imidazolate frameworks (ZIFs)—where the Zn-imidazolate-Zn link replicates the characteristic T-O-T angle of zeolites. The sodalite-type topology of the cubic ZIF-8 framework defines 12.0 Å diameter pores connected via 3.5 Å diameter apertures (6-rings). The unmatched $I_2$ sorption capacity, retention, and selectivity of the ZIF-8 pore network benefits from the close correspondence of these 6-ring apertures to the $I_2$ molecular dimensions.

Activated (which means desolvated) ZIF-8 (approx. 1.5 g, Sigma-Aldrich) was loaded with iodine at approx. 75° C. to different final concentrations (20, 40, 60, 80, 100, and 120 wt % $I_2$). A portion of each sample was annealed at 125° C. for 6 h to remove $I_2$ from the external surface. While the as-loaded samples were brown, with the color intensity increasing for higher loadings, all samples faded to a pale brown or tan shade upon annealing, independent of $I_2$ loading. This suggests that the color of the bulk sample is correlated to external surface-sorbed $I_2$.

Variable pressure X-ray diffraction measurements, for a 40 wt % $I_2$ sample, indicate that the $I_2$-containing sample can be amorphized at the same pressure as the vacant framework (approx. 0.34 GPa). Bulk powders of $I_2$-loaded ZIF-8 (as-loaded and annealed) were amorphized within a pellet press (9 ton, 10-mm-diameter die, approx. 1.2 GPa average pressure), and redispersed as powders for subsequent analysis. The structure of the crystalline and amorphized materials were compared using PDF analysis of high energy X-ray scattering data collected at beamline 11-ID-B at the Advanced Photon Source at Argonne National Laboratory. The PDF provides local structure information, independent of crystallinity, as a weighted histogram of all atom-atom distances within a material. Not only can the PDF provide insight into the structural features that are retained in the amorphous ZIF-8 framework, but using a differential approach, and subtracting the contribution associated with the framework, the local I-I and I-framework interactions in the crystalline and amorphized materials can be directly compared.

The well-defined long-range correlations, evident in PDFs for the crystalline materials, are eliminated for the amorphized ZIF-8 systems (FIG. 1). However, the shorter range features, including those up to 6 Å, which correspond to the Zn-imidazolate-Zn links, are entirely preserved in the amorphous materials. The combined retention of guests, porosity, and the Zn . . . Zn connectivity in the pressure-amorphized materials suggests that the sodalite topology of ZIF-8 is preserved, despite the local structural changes that destroy the long-range order, that is, the crystallinity. These structural changes are likely to involve symmetry-reducing distortions of the 6-ring apertures, eliminating the well-defined features in the PDF beyond approx. 6 Å and impeding diffusion of guest molecules through the framework. This displacive amorphization contrasts with the reconstructive transition to a dense amorphous phase induced thermally in ZIFs containing unsubstituted imidazole.

Figure 2:
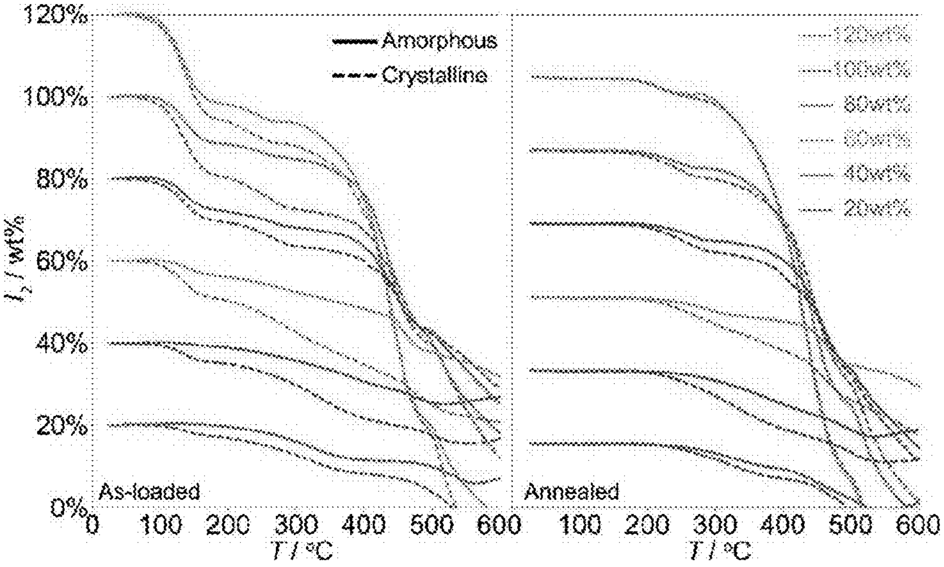
FIG. 2 are graphs showing the mass loss associated with $I_2$ release from the crystalline and amorphized ZIF-8 based on TGA of the as-loaded (left) and annealed (right) samples. The mass losses for the vacant ZIF-8 materials have been subtracted.

While the long-range framework order is eliminated upon amorphization, the short-range I-I and I-framework interactions remain unchanged. Indeed, a larger change in local structure is associated with the annealing and surface-desorption compared to the amorphization itself (FIG. 1). Specifically, the nearest neighbor I-I peak shifts from 2.8 to 2.6 Å while simultaneously narrowing, indicating less disorder (dynamic or static). This is accompanied by an increase in the relative intensity of the second and third peaks at 3.85 and 4.3-4.4 Å, associated with intermolecular interactions within pores. These changes may reflect a refinement of the $I_2$ arrangement within the pores upon annealing. The retention of $I_2$ is enhanced in the amorphized relative to the crystalline ZIF-8, as evidenced from thermogravimetric analysis (TGA). The mass losses upon heating (10° C./min, $N_2$ flow, see FIG. 2) were shifted to higher temperatures for the amorphized materials, by up to 150° C. These gains were most pronounced for the intermediate $I_2$ loadings. At the highest loadings, there appeared to be some destabilization of the framework, with a greater overall mass loss for the $I_2$-containing framework than for the vacant ZIF-8. This is consistent with the reduced crystallinity observed at high loadings. For the as-loaded samples, the TGA showed mass loss associated with surface desorption starting at 100-120° C., with a further loss at 170-240° C. associated with release of $I_2$ from within the pores. For the surface-desorbed samples, the mass loss occurred at 170-240° C., starting at lower temperatures for higher loadings.

The improvement in $I_2$ retention was quantified by comparing the $I_2$ mass loss from ZIF-8 samples (annealed 80 wt %) at constant temperature in the TGA apparatus (200° C., $N_2$ flow). The $I_2$ loss is retarded by a factor of approximately $I_2$ in the amorphized ZIF-8 (see FIG. 2).

The enhanced guest retention of the amorphized material is associated with a kinetic trapping mechanism, rather than a change in binding energy, with identical host-guest interactions in the crystalline and amorphous materials. Leach testing, which evaluates the long-term durability of a final waste form, by heating in deionized water for 7 days at 90° C., showed minor differences in $I_2$ retention upon amorphization. As such, the amorphized pellets are most suitable for applications as an interim waste-form. These can be incorporated into core-shell structured final waste form that combines excellent long-term stability with potentially unmatched $I_2$ densities.

The ZIF-8 framework can be amorphized at the same mild pressure and temperature conditions as empty ZIF-8. This is particularly striking considering the extremely high $I_2$ loading (up to approx. 6 $I_2$ molecules per sodalite cage). This is generally consistent with the relative independence of certain MOFs' compressibility to different guest loadings. The structural changes to the framework associated with this amorphization improve the $I_2$ retention upon heating, by up to 150° C., retaining the local structure of the captive $I_2$ despite the changes to the framework crystallinity.

An efficient radioactive waste capture process, in reprocessing nuclear fuel or cleanup following inadvertent environmental release, is perhaps one of the highest impact (in terms of cost savings per unit quantity) potential sorption applications for MOFs. In this field, there are overwhelming economic drivers that dictate that contamination, and accordingly, processing steps and materials, must be minimized, with the same storage requirements applied to any component used as part of the waste capture as for the waste itself. The amorphization of $I_2$-loaded ZIF-8 provides for secure interim storage before incorporation into a long-term waste form, ensuring non-contamination of the environment. The unmatched $I_2$ uptake capacity for ZIF-8, relative to existing zeolite getters, and the possibility to minimize subsequent release through amorphization, makes this a promising $I_2$ capture method.

Furthermore, the invariance of the host-guest interactions to pressure treatment, answers an important question in materials for radioactive waste storage. Here, an optional technology to densify radioactive waste to a monolithic form that is suitable for transport is hot isostatic pressing (HIPping). The modified MOFs of the present invention provide a route to an interim waste form based on amorphized ZIF-8, but more generally, it provides insight into the behavior of other $I_2$ containing MOFs under HIPping conditions, showing that the pore structure can retain iodine under pressure.

More generally, in contrast to chemical post synthetic modification of MOF structure and sorption-desorption behaviors which must be applied before guest-loading, this mechanical modification through pressure can be applied at any point in a sorption-sequestration process. Consequently, pressure-induced structural changes can be used as a macro-scale handle with which to control the nanoscale sorption properties. Specifically, they can be used for increasing hysteresis in the sorption-desorption kinetics, at will, to kinetically trap $I_2$.

In another embodiment, modified MOFs may be used for the controlled release of agrochemicals (insecticides, herbicides, and fungicides). This could reduce the harmful effects on the environment and have a targeted release on as needed basis. A similar concept is also valid for the targeted release of various drugs.

In an example, $^{129}I$ in the form of $I_2$ gas, which may be from spent nuclear fuel reprocessing or from nuclear reactor accidents, which is of particular concern due to its very long half-life, its potential mobility in the environment and its deleterious effect on human health, may be treated to remove and store $^{129}I$. $^{129}I$ is separated from spent fuel during fuel reprocessing as $^{129}I_2$ vapor. The gas containing $^{129}I_2$ vapor is passed through a bed of ZIF-8, such that the ZIF-8 selectively captures the $^{129}I$. the ZIF-8 is then modified by pressure to form a stable storage media.

In another example, radiological $Cs^+$ ion in aqueous solutions, for example in seawater, from nuclear reactor accidents or from spent nuclear fuel reprocessing is captured by a charged framework MOF material, and the MOF is modified by pressure treatment.

In another example, radiological Uranyl (e.g., $UO_2^{2+}$, $(UO_2)CO_3(OH)_3^-$, $UO_2(CO_3)_2^{2-}$, $UO_2(CO_3)_3^{4-}$) ion in aqueous solutions, for example seawater, is captured by a charged framework (2D) MOF material, and the MOF is modified by pressure treatment.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A modified metal-organic-framework material, comprising:

a waste material adsorbed in the metal-organic framework material having a crystalline porous structure;

wherein the crystalline porous structure of the metal-organic framework material has been converted to an amorphous structure.

2. The material of claim 1, wherein the metal-organic framework material is selected from a group consisting of carboxylate-based MOFs, phosphonate-based MOFs, N-based linker MOFs, and N—O-heterofunctional linkers based MOFs.

3. The material of claim 1, wherein the metal-organic framework material is selected from a group consisting of IRMOFs series, MOF-74 series, Sandia Metal-Organic Frameworks (SMOFs) series, and ZIFs series.

4. The material of claim 1, wherein the waste material is a gas.

5. The material of claim 1, further comprising an ionic species adsorbed from solution.

6. The material of claim 4, wherein the gas is selected from the group consisting of isotope form of I, H, CO, $CO_2$, Kr, Xe, Ra, Cs, Ba, Y, Sr, and Rb.

7. The material of claim 5, wherein the ionic species is selected from the group consisting of cesium and radioactive uranyl-containing ions.

8. The material of claim 1, wherein the metal-organic framework material is treated with an additive before adsorbing the waste material.

9. The material of claim 8, wherein the additive is silver or palladium.

10. A method of forming a waste storage material, comprising:

providing a metal-organic framework material having a crystalline structure;

adsorbing a waste material into pores of the metal-organic framework material; and applying pressure to the metal-organic framework material to convert the crystalline structure of the metal-organic framework to an amorphous structure.

11. The method of claim 10, wherein the pressure is between 7,350 psi and 18,000 psi.

12. The method of claim 8, wherein the pressure is applied at ambient temperature.

13. The method of claim 8, wherein the metal-organic framework material is first treated by impregnating the metal-organic framework material with silver.

14. The method of claim 10, wherein pressure is applied by hot isostatic pressing at a temperature below the volitization temperature of the waste.

* * * * *